United States Patent [19]
Bourgeois-Jacquet

[11] Patent Number: 6,113,276
[45] Date of Patent: Sep. 5, 2000

[54] SLEWING BEARING WITH INTEGRAL SENSOR

[75] Inventor: Pierre Bourgeois-Jacquet, Avallon, France

[73] Assignee: RKS S.A., Avallon, France

[21] Appl. No.: 08/874,486

[22] Filed: Jun. 13, 1997

[30] Foreign Application Priority Data

Jun. 21, 1996 [FR] France ................................ 96 07768

[51] Int. Cl.[7] .................................................. F16C 33/30
[52] U.S. Cl. ..................................... 384/448; 324/207.25
[58] Field of Search ................................. 384/448, 609, 384/618, 619; 324/207.25

[56] References Cited

U.S. PATENT DOCUMENTS

| | | | |
|---|---|---|---|
| 3,793,545 | 2/1974 | Leiber et al. | 310/168 |
| 4,746,264 | 5/1988 | Kishi et al. | 324/207.25 X |
| 4,798,299 | 1/1989 | Bayer et al. | 384/448 X |
| 4,861,171 | 8/1989 | Adachi | 384/455 |
| 4,875,785 | 10/1989 | Santos et al. | 384/448 |
| 4,906,113 | 3/1990 | Sague | 384/619 X |
| 4,969,753 | 11/1990 | Kato et al. | 384/448 |
| 5,624,192 | 4/1997 | Rigaux et al. | 384/448 |

FOREIGN PATENT DOCUMENTS

| | | |
|---|---|---|
| 0 320 322 | 6/1989 | European Pat. Off. . |
| 2 128 827 | 10/1972 | France . |
| 24 03 854 | 8/1975 | Germany . |

OTHER PUBLICATIONS

Patent Abstracts of Japan, vol. 7, No. 6 (P–167) [1151], Jan. 11, 1983.

Primary Examiner—Thomas R. Hannon
Attorney, Agent, or Firm—Beveridge, Degrandt, Weilacher & Young, LLP

[57] ABSTRACT

Slewing bearing of the type adapted to assure the rotation of a mobile structure relative to a chassis by means of a toothed ring, comprising a turning ring 2 and a non-turning ring 1 between which there is disposed a row of rolling members 5. The slewing bearing comprises position sensing means 3, 4 intergrated into said bearing.

34 Claims, 1 Drawing Sheet

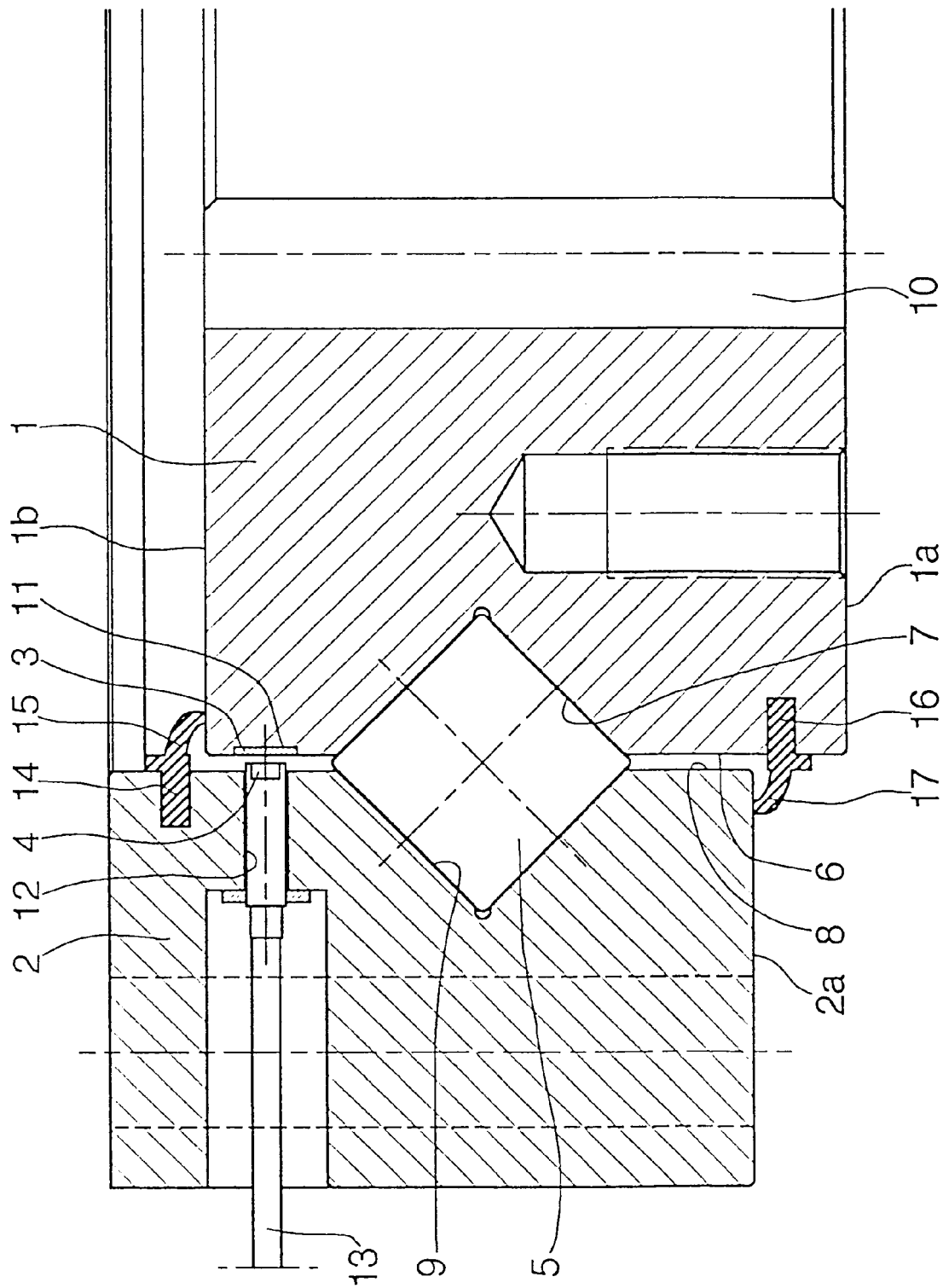

SLEWING BEARING WITH INTEGRAL SENSOR

BACKGROUND

The present invention concerns a slewing bearing of the type capable of assuring the rotation of a mobile part relative to a fixed part. The fixed part can be the hull of a ship, for example, the chassis of a land vehicle such as a combat tank, or the lower part of a tower crane. The mobile part supports equipment that has to be oriented angularly, for example the turret of the tank or the upper part of the tower crane.

In these various applications, the need has arisen to know precisely the position and/or the angular speed of the mobile part relative to the fixed part. In the case of tower cranes, knowing the position of the upper part of the crane which includes a boom can prevent collisions between the booms of two cranes on the same site.

With this aim in mind, the use of encoders equipped with gears that mesh with teeth of the slewing bearing or with separate teeth is known in itself. It is also possible to use inductive proximity sensors on these teeth, or large diameter resolvers. However, these various systems either wear rapidly and lead to measurement errors due to operating clearances and to aging of the equipment, or are costly, difficult to adjust and bulky and require complex interfaces.

The aim of the present invention is to remedy the aforementioned drawbacks by proposing a slewing bearing equipped with a sensor that is compact, fitted and adjusted in the factory and requires no maintenance.

The object of the invention is to propose a slewing bearing equipped with a sensor integral with said bearing.

SUMMARY OF THE INVENTION

The slewing bearing of the invention is of the type designed to assure the rotation of a mobile structure relative to a chassis by means of a toothed ring. The bearing includes a rotating ring and a non-rotating ring between which there is disposed a row of rolling members. The slewing bearing comprises position sensing means integrated with said bearing. A sensor of this kind is able to operate in an environment that has been rendered difficult by the presence of grease, oil or dust, and is perfectly suitable for outdoor applications such as military vehicles and contractor's plant.

In one embodiment of the invention, the sensor means comprise at least one sensor attached to one of the rings of the bearing and an encoder attached to the other ring and facing the sensor at a small distance.

The sensor is advantageously disposed in a through-hole provided in the ring to which it is attached.

In one embodiment of the invention the encoder comprises a flexible strip magnetised with alternating poles. The strip can include a layer of plastoferrite disposed between an amagnetic steel protection strip and a support strip.

In one embodiment of the invention, the sensor is radially disposed relative to the encoder.

In one embodiment of the invention the encoder is housed in a groove disposed on a cylindrical surface of the ring to which it is attached.

In one embodiment of the invention the sensor means comprise two sensors. The encoder having two non-contiguous ends, the slewing bearing can comprise a data processing unit for processing data emitted by the sensors, capable of detecting any abnormal information from a sensor facing the non-contiguous ends of the encoder.

In one embodiment of the invention the slewing bearing comprises sealing means defining a closed space between the two rings inside which the rolling members and the sensor means are disposed.

By virtue of the invention, the slewing bearing with integral sensor does not require any maintenance and is not subject to any measurement errors due to the clearances of mechanisms such as gears or to manufacturing tolerances of the same components.

The invention will be better understood and other advantages will emerge from the detailed description of one embodiment given by way of non-limiting example and illustrated by the accompanying drawing in which the single figure is a fragmentary sectional view of the slewing bearing of the invention taken along a plane passing through its axis.

DETAILED DESCRIPTION

As can be seen in the single figure, the vertical axis slewing bearing comprises an inner ring 1, an outer ring 2, an encoder 3, at least one sensor 4 and a row of rolling members 5. The inner ring 1 has a cylindrical external surface 6 on which a rolling path 7 is provided and the outer ring 2 has a bore 8 on which a rolling path 9 is provided. The rolling members 5 are disposed between the rolling path 7 on the inner ring 1 and the rolling path 9 on the outer ring 2.

The inner ring 1 is designed to be fixed to a chassis or to a structure (not shown) provided with a toothed ring to procure the rotation and includes a fixing groove 10. The cylindrical outer surface 6 of the inner ring 1 is delimited on one side by the radial surface 1a and on the other side by the radial surface 1b. There is an annular groove 11 on the cylindrical outside surface 6 of the inner ring 1, axially between the rolling members 5 and the radial surface 1b. The width of the groove 11 is much less than its depth and the groove has radial edges. The groove 11 is adapted to receive the encoder 3 to be described in detail later.

The outer ring 2 has a radial hole 12 through it, in which the sensor 4 is disposed so that it is disposed radially opposite the encoder 3. The sensor 4 projects slightly out of the bore 8 in the outer ring 2, in the radial direction towards the inside of the bearing, to define a particular airgap between the sensor 4 and the encoder 3.

The sensor 4 is connected by a cable 13 to data processing means such as an electronic unit, not shown.

The outer ring 2 has on its bore 8, near the sensor 4, a groove 14 in which is disposed a seal 15 which projects in the radial direction towards the inside of the bearing and comes into rubbing contact with the radial surface 1b of the inner ring 1. Likewise, the inner ring 1 has an annular groove 16 on its cylindrical outside surface 6, axially opposite the encoder 3, and in which is disposed a seal 17 that projects in the radial direction towards the outside of the bearing and comes into rubbing contact with the radial surface 2a of the outer ring 2. Accordingly, a closed space is defined between the inner and outer rings 1 and 2 and the seals 15 and 17 in which the encoder 3, the sensor 4 and the rolling members 5 are housed so that they are protected against pollution by grease, dust or water.

The encoder 3 includes a flexible linear strip the length of which corresponds to the circumference of the groove 11 in the inner ring 1 in which it is housed. The encoder 3 is of the magnetic type polarised with alternately North and South poles. The sensor 4 is capable of detecting the magnetic field generated by the encoder 3. Accordingly, the displacement of the encoder 3 relative to the sensor 4 causes a voltage variation that is transmitted via the cable 13 to an electronic system, not shown, which is capable of measuring the relative linear displacement of the two rings 1 and 2 determining the direction of this displacement. This angular position or speed information can then be processed and sent to a display or to an automatic controller. Knowing the total length of the circumference of the inner ring 1, it is possible to convert the linear measurement into an angular measurement using appropriate integration software integrated into the electronic system.

The encoder 3 in the form of a magnetic strip comprises a first support strip which is in contact with the bottom of the groove 11 and which is made of magnetised stainless steel. This support strip is covered by a magnetised synthetic material (plastoferrite) strip glued to the support strip. To protect it, the magnetised synthetic material strip can be covered with an amagnetic steel outer strip. This outer strip protects the other strips against mechanical damage. The encoder 3 is glued into the groove 11 after cutting it to the correct gap. However, a short length, in the order of 1 mm to 2 mm, of the groove 11 may be left uncovered by the encoder, given that it is extremely difficult to butt joint the two ends of the strip. The encoder 3 is cut without reference to the poles, for example in the middle of a North pole or at the edge of a South pole. Thus, it is not known if the alternation and the dimensions of the poles are complied with. Accordingly, in and near the area with no encoder, no reliable measurement is possible and the sensor 4 may falsify the position detection on passing over this area.

To overcome this problem the outer ring 2 can be equipped with two sensors 4 in respective radial holes 12. Accordingly, regardless of the angular position of the rings 1 and 2, at least one of the two sensors 4 is facing a portion of the groove 11 equipped with the encoder 3. The electronic system is then adapted to be able to recognise abnormal data from one of the sensors 4, due to its passage near the area of the groove 11 in which there is no encoder 3 or near the end of the encoder 3, and to ignore this abnormal data in favour exclusively of data from the other encoder 4 which is facing a portion of the encoder 3. Furthermore, equipping the outer ring 2 with two sensors 4 enhances detection accuracy. With a bearing with a single sensor, the measurement area is in the order of the dimension of a North pole or a South pole of the encoder 3. With a bearing with two sensors, the error can be less than this. Another advantage of the bearing with two sensors 4 is that the resulting redundant system is very safe. Dual redundancy can even be achieved by installing a third sensor.

In accordance with the invention, the position sensor is entirely integrated into the bearing and there is no risk of it being damaged by external impact or of its accuracy being reduced because of wear of the teeth of the slewing bearing. Moreover, final assembly of the system for which the slewing bearing is intended is simplified, the latter bearing being pre-equipped with its position sensor.

I claim:

1. Slewing bearing adapted to assure the rotation of a mobile structure relative to a chassis by means of a toothed ring, comprising a rotating ring and a non-rotating ring between which there is disposed a row of rolling members, a position sensing means integrated into said bearing, said position sensing means including a magnetised encoder which has a flexible strip magnetised with alternating poles.

2. Slewing bearing according to claim 1 wherein the sensing means includes a sensor which is disposed in a hole through the ring to which it is attached.

3. Slewing bearing according to claim 1 wherein the strip comprises a layer of plastoferrite disposed between an amagnetic steel protection strip and a support strip.

4. Slewing bearing according to claim 1 wherein the sensing means includes a sensor which is disposed radially relative to the encoder.

5. Slewing bearing according to claim 1 wherein the encoder is housed in a groove on a cylindrical surface of the ring to which it is attached.

6. Slewing bearing according to claim 1 wherein the sensing means includes two sensors.

7. Slewing bearing according to claim 1 wherein the flexible strip has two ends, said position sensing means including two sensors which face the encoder, said bearing including a data processing unit for processing data emitted by the two sensors and for detecting abnormal data from a said sensor which faces an end of the encoder.

8. Slewing bearing according to claim 1 wherein there is a gap between the two ends of the flexible strip.

9. Slewing bearing means according to claim 1 including sealing means which define, between the two races, a closed space within which the rolling members and the sensing means are disposed.

10. Slewing bearing adapted to assure the rotation of a mobile structure relative to a chassis by means of a toothed ring, comprising a rotating ring and a non-rotating ring between which there is disposed a row of rolling members, a position sensing means integrated into said bearing, said position sensing means including a magnetised encoder, said sensing means including at least one sensor attached to one of the rings, the sensing encoder means also including an encoder attached to the other ring and so disposed as to face the sensor at a distance, said encoder including a flexible strip magnetised with alternating poles.

11. Slewing bearing according to claim 10 wherein the sensor is disposed in a hole through the ring to which it is attached.

12. Slewing bearing according to claim 10 wherein the strip comprises a layer of plastoferrite disposed between an amagnetic steel protection strip and a support strip.

13. Slewing bearing according to claim 10 wherein the sensor is disposed radially relative to the encoder.

14. Slewing bearing according to claim 10 wherein the encoder is housed in a groove on a cylindrical surface of the ring to which it is attached.

15. Slewing bearing according to claim 10 wherein the sensing means includes two sensors.

16. Slewing bearing according to claim 10 wherein the flexible strip has two ends, said position sensing means including two sensors which face the encoder, said bearing including a data processing unit for processing data emitted by the two sensors and for detecting abnormal data from a said sensor which faces an end of the encoder.

17. Slewing bearing according to claim 16 wherein there is a gap between the two ends of the flexible strip.

18. Slewing bearing means according to claim 10 including sealing means which define, between the two races, a closed space within which the rolling members and the sensing means are disposed.

19. Slewing bearing adapted to assure the rotation of a mobile structure relative to a chassis by means of a toothed ring, comprising a rotating ring and a non-rotating ring between which there is disposed a row of rolling members, a position sensing means integrated into said bearing, said position sensing means including a magnetised encoder which has a flexible strip magnetised with alternating poles, said flexible strip having two ends.

20. Slewing bearing according to claim 19 wherein the sensor is disposed in a hole through the ring to which it is attached.

21. Slewing bearing according to claim 19 wherein the strip comprises a layer of plastoferrite disposed between an amagnetic steel protection strip and a support strip.

22. Slewing bearing according to claim 19 wherein the sensor is disposed radially relative to the encoder.

23. Slewing bearing according to claim 19 wherein the encoder is housed in a groove on a cylindrical surface of the ring to which it is attached.

24. Slewing bearing according to claim 19 wherein the sensing means comprise two sensors.

25. Slewing bearing according to claim 19 wherein the flexible strip has two ends, said position sensing means including two sensors which face the encoder, said bearing including a data processing unit for processing data emitted by the two sensors and for detecting abnormal data from a said sensor which faces an end of the encoder.

26. Slewing bearing according to claim 25 wherein there is a gap between the two ends of the flexible strip.

27. Slewing bearing means according to claim 19 including sealing means which define, between the two races, a closed space within which the rolling members and the sensing means are disposed.

28. Slewing bearing adapted to assure the rotation of a mobile structure relative to a chassis by means of a toothed ring, comprising a rotating ring and a non-rotating ring between which there is disposed a row of rolling members, a position sensing means integrated into said bearing, said position sensing means including a magnetised encoder and two sensors which face the encoder, the encoder having two non-contiguous ends, said bearing including a data processing unit for processing data emitted by the sensors and for detecting abnormal data from a sensor facing an encoder.

29. Slewing bearing according to claim 28 wherein the sensor is disposed in a hole through the ring to which it is attached.

30. Slewing bearing according to claim 28 wherein the strip comprises a layer of plastoferrite disposed between an amagnetic steel protection strip and a support strip.

31. Slewing bearing according to claim 28 wherein the sensor is disposed radially relative to the encoder.

32. Slewing bearing according to claim 28 wherein encoder is housed in a groove on a cylindrical surface of the ring to which it is attached.

33. Slewing bearing means according to claim 28 including sealing means which defines, between the two races, a closed space within which the rolling members and the sensing means are disposed.

34. Slewing bearing according to claim 28 wherein there is a gap between the two ends of the flexible strip.

* * * * *